July 14, 1953  F. W. ROWE  2,645,455
REMOVABLE DRUM FISHING WINCH
Filed April 3, 1950  4 Sheets-Sheet 1
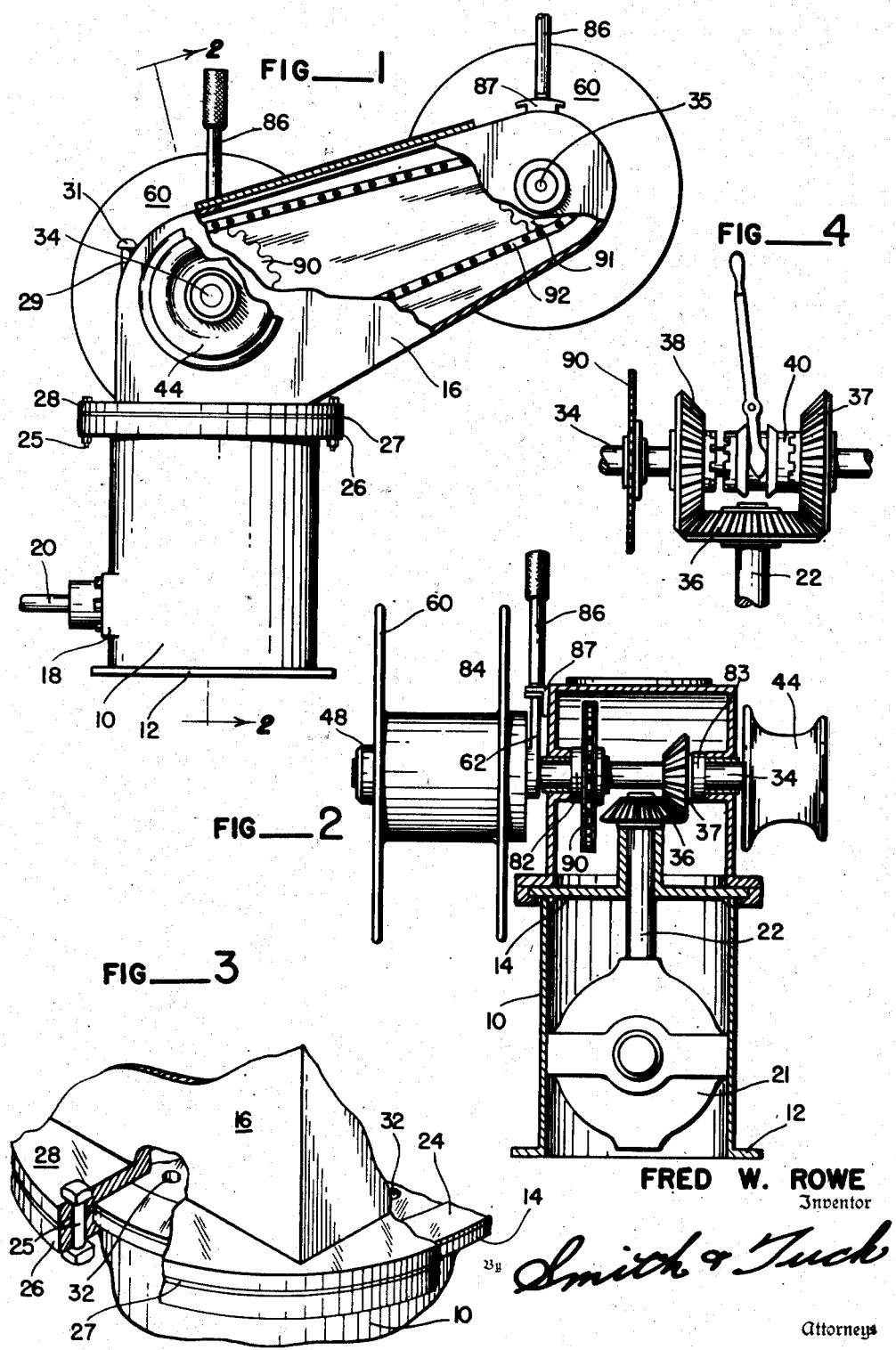
FRED W. ROWE
Inventor
By Smith & Tuck
Attorneys

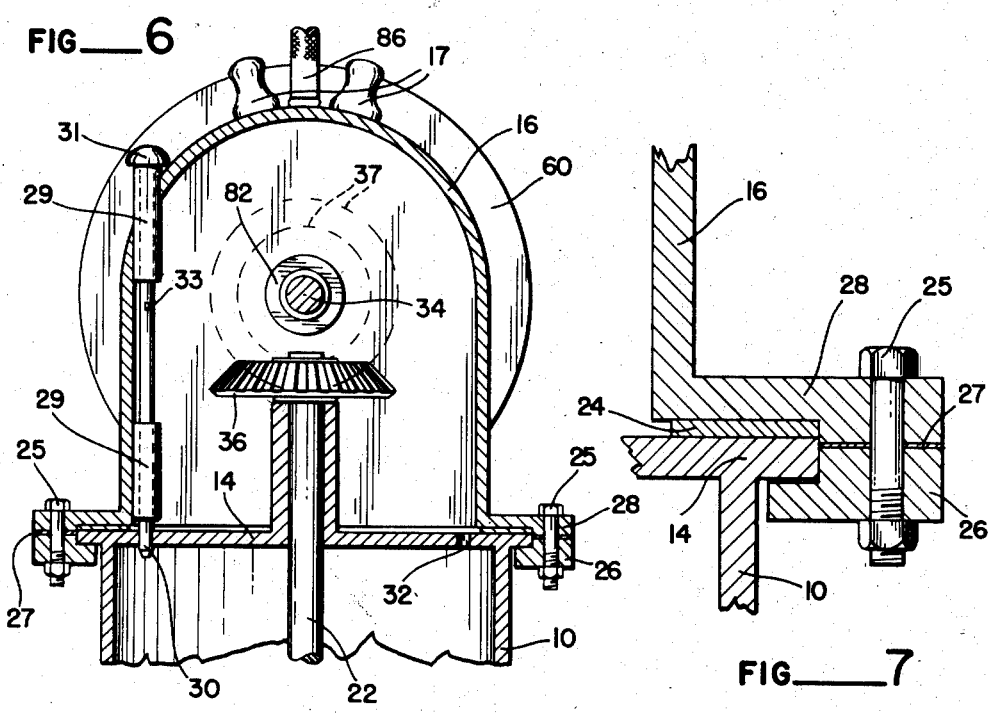
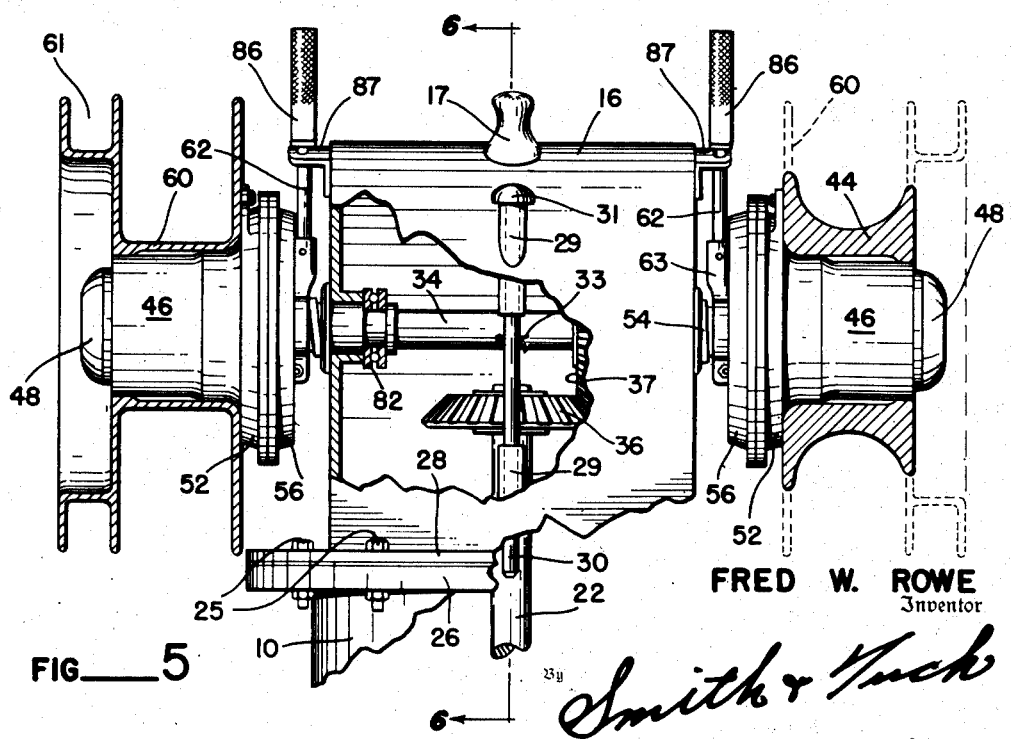

July 14, 1953 F. W. ROWE 2,645,455
REMOVABLE DRUM FISHING WINCH
Filed April 3, 1950 4 Sheets-Sheet 3
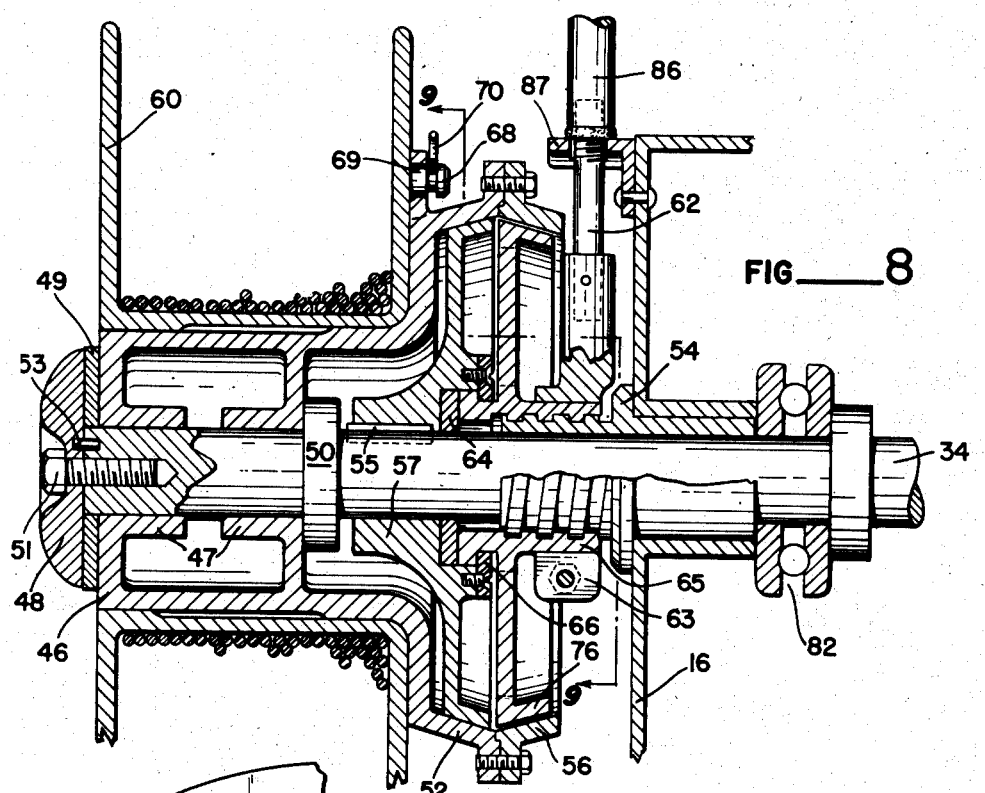
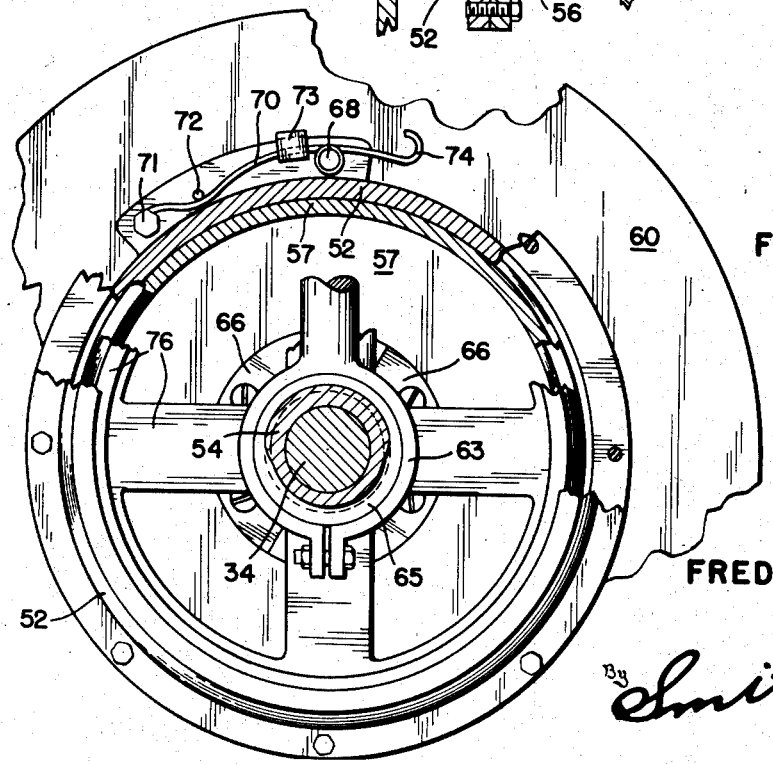
FRED W. ROWE
Inventor
By Smith & Tuck
Attorneys

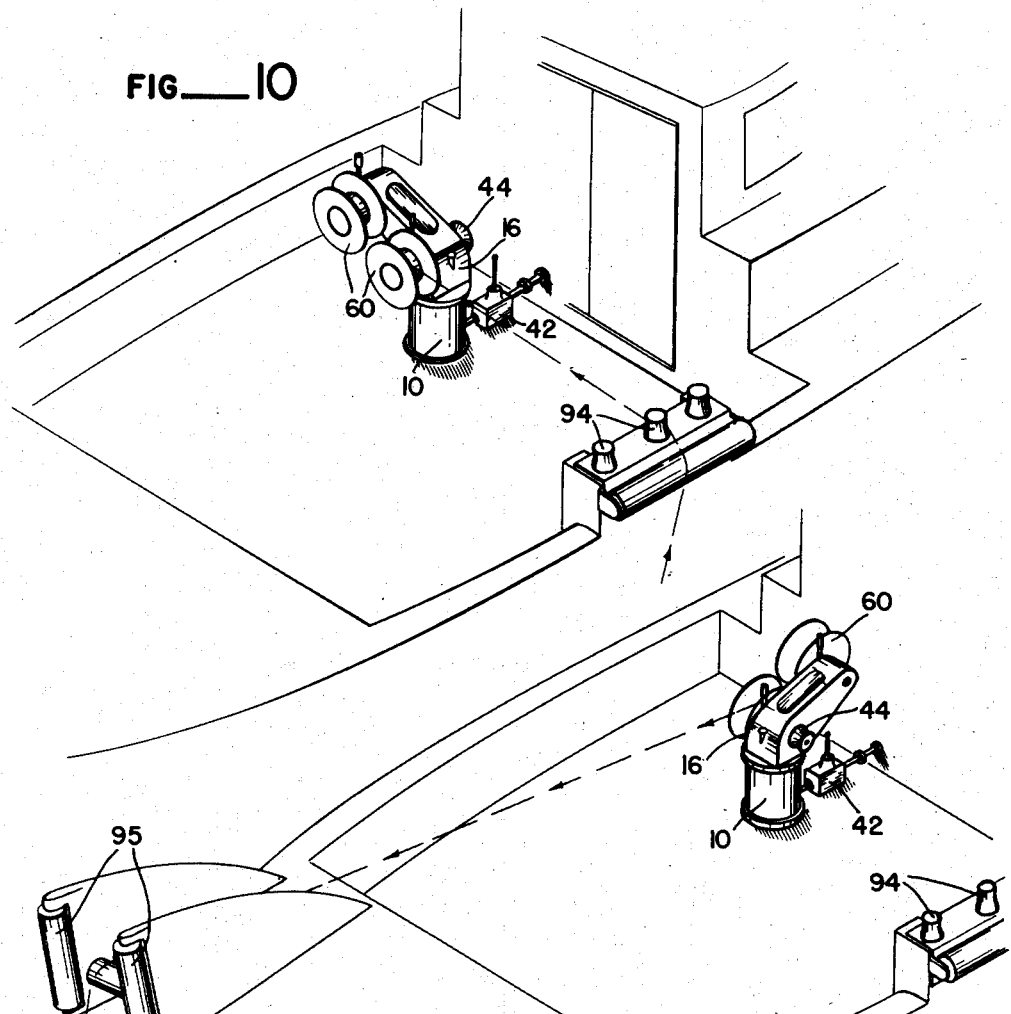
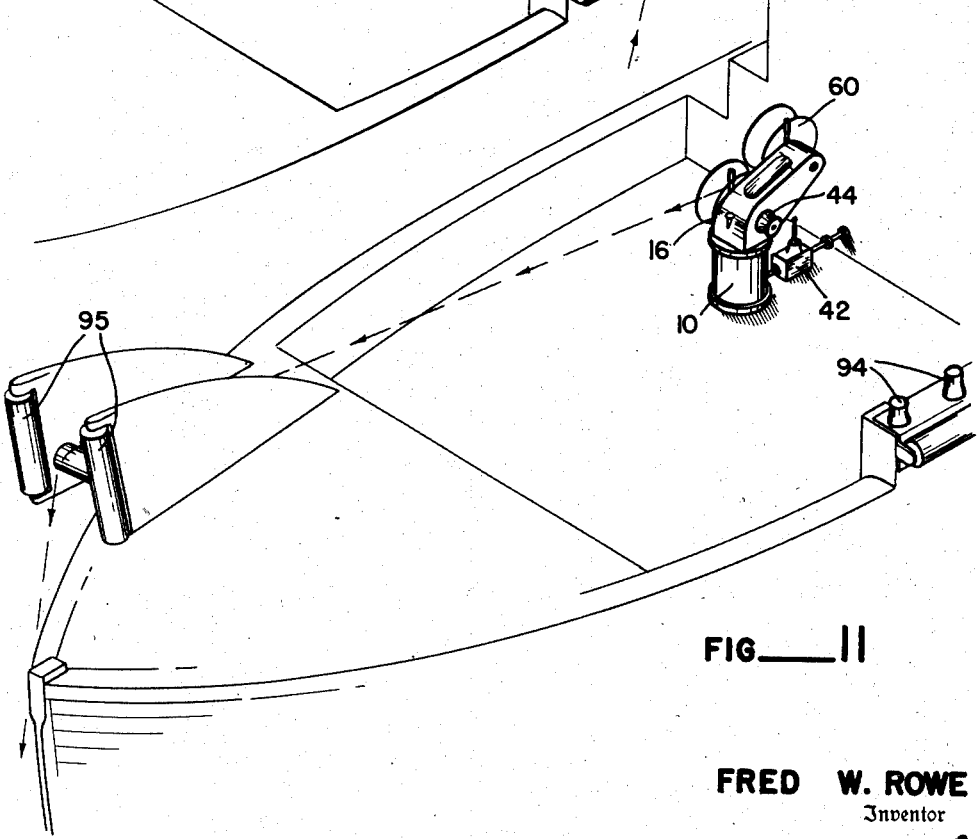

Patented July 14, 1953

2,645,455

UNITED STATES PATENT OFFICE 2,645,455

REMOVABLE DRUM FISHING WINCH

Fred W. Rowe, Seattle, Wash.

Application April 3, 1950, Serial No. 153,646

6 Claims. (Cl. 254—137)

This winch is arranged to particularly adapt it to fishing and, more especially, to the needs of the groundline fisherman. The winch consists essentially of a plurality of connected power shafts, each of which is arranged to accept relatively light fish line reels which can be easily handled by one person and which can be removed and replaced with another reel very quickly during the fishing operation. This arrangement is particularly desirable where long ground lines are being payed out or taken in, and this is due to the fact that the ground lines are of relatively great length and, because of this, are divided into usually two hundred fathom lengths. It consequently is desirable to provide, for the easy removal or replacement of a line reel so that the paying out or taking in of the line can be continuous during the movement of the boat.

In long line fishing the line normally rests upon the bottom of the sea and is provided, at frequent intervals, normally, from three to nine feet, with spaced hooks that are baited suitably for the fish sought. In handling several hundred or a thousand of baited hooks on a single line, the spooling of the same is quite a problem and it has been found that the better plan is to use a relatively light stranded steel wire or cable, normally about one sixteenth of an inch or slightly larger in diameter, and to have, at spaced intervals, on this line crimped or swedged-on members which serve as abutments for the attachment of baited hooks. The hooks themselves are normally attached to wire gangings which take the place of leaders in ordinary fishing, and, the attachment to the main fishing line is by means of a spring clip so that the hook may be attached or detached without stopping the movement of the line in either the paying out or hauling in operation.

It is normal to use eight or more skates of gear of about two hundred fathom lengths and to have each end of this line or cable provided with quick attaching and detaching means so that a large number of skates or gear can be laid as a single long line. Normally, in laying out a set of gear of this order a buoy line, with an anchor attached and with the end of a fishing line attached either to the buoy line or the anchor, is dropped off on the stern of the boat, then the boat proceeds and the fishing line is spooled off the drum, which is mounted upon a winch. The line may be taken out by the movement of the boat or it may be unspooled by the driving action of the winch which uncoils the line at a speed slightly greater than the movement of the boat so that there will be no tension on the line, and it will conform fully to the natural contour of the ocean's bottom. Normally, a number of skates of line are connected together and spooled upon a drum. With this present equipment a quantity of line is placed upon the drum so that the total weight of the drum and the line will still be within the weight that a man can safely handle under normal fishing conditions, where the roll of the boat and inclement weather and other conditions met while fishing, limit the weight that one man can safely handle and these same conditions make it impractical to require that two men attempt to handle a single drum.

This present winch is ideally constructed to fully meet the conditions encountered in fishing. As soon as the line has been payed out from a single spool, a second spool is then connected to the end of the line previously payed out, and the operation continues without the necessity of stopping the boat. It then follows that a fully loaded reel will be substituted for the one that has just been emptied and, this operation can be continued until the next spools have been payed out to give the length of fishing line desired. In recovering or hauling in the line the same general procedure is followed, namely; one spool is filled and then the line is connected to an empty spool, and for this purpose it follows that a minimum of two power driven shafts are required and in this manner the filled spool can be removed from one of the driven shafts and an empty one substituted for it, to be employed when the second spool has been completely filled.

Now, it has been found most practical to have the line payed out directly over the stern of the fishing boat, because in this manner, the line can be laid accurately because the boat is in exact position to be driven on a predetermined course. On the other hand, when it is desired to pick up the line, it has been found most advantageous to bring the line in over the side of the boat, in this way, the fish and line are kept well away from the propeller of the boat, and as the fish come over the side of the boat the ganging can be unsnapped from the line, so that it may continue the spooling operation and then the fish either are taken from the hook, or, if they are very securely hooked, they are merely dropped on deck and the hook is removed at a later time. To accommodate these two fishing positions and have the line pay out or spooled in to best advantage, it is found that the plane of the spool should be pointed toward the stern of the boat in paying out, and at approximately right angle to the side of the boat when the line is being retrieved. Actually the line is passing through fair leads in the form of a normally horizontal roller and through two or more vertical rollers, so that a definite guiding is provided for the line, and the plane of the spool should be directed to this guiding point.

The principal object of this present invention therefore, is to provide a detachable spool fishing winch that is particularly adapted to the paying out and retrieving of a set of long ground line fishing gear.

A further object of this equipment is to provide a fishing winch having a plurality of driven shafts so that in turn a plurality of easily handled line holding spools or drums may be selectively placed on the power shafts or easily removed therefrom.

A further object of this invention is to provide means whereby the fishing winch can be swung on its vertical axis so that the line carrying spools can be so positioned that the line will pay out from over the stern of the boat, and when the line is retrieved the same may be placed in the most suitable position for retrieving the line over the side of the fishing boat.

Further objects, advantages and capabilities will be apparent from the description and disclosure in the drawings, or may be comprehended or are inherent in the device.

In the drawings:

Figure 1 is a side elevation of a winch made after the teachings of this invention, certain parts are broken away to more fully illustrate this equipment;

Figure 2 is a vertical cross-sectional view taken at right angles to the view of Figure 1 and along the broken lines 2—2 of that figure;

Figure 3 is a fragmentary perspective view showing the bearing plates and clamping means which adapt this winch for easy swinging about its vertical axis;

Figure 4 is a fragmentary elevational view showing a substitute gear arrangement for the gear mechanism shown in Figure 2, and providing a reversing means so that the line holding drums may be driven in either direction;

Figure 5 is an elevation, in fragmentary form, with certain parts shown in section to better illustrate the clutching means which may be used on each end of the driven shaft and showing a simple form of the winch employing only one driven shaft;

Figure 6 is a cross-sectional view taken along the line 6—6 of Figure 5;

Figure 7 is a fragmentary vertical sectional view through the positioning and clamping means forming the connection between the stationary and movable portions of the winch and illustrating the bearing washer employed;

Figure 8 is a vertical sectional view taken through the axis of one end of a typical driven shaft and illustrating the clutching and braking means employed;

Figure 9 is a vertical cross-sectional view taken along the line 9—9 of Figure 8;

Figure 10 is a perspective view showing in fragmentary form the deck of a small fishing boat of the type well adapted for this type of fishing and showing the winch in position to haul in the line over the side of the boat; and Figure 11 is a view similar to Figure 10, but showing the winch in its paying out position wherein the line is payed out over the stern of the boat.

Referring more particularly to the disclosure in the drawings, the numeral 10 designates the pedestal base of the winch. This is provided at its lower end with a bolting down flange 12 by which it is secured normally, fixedly, on the deck of a fishing boat. At its upper end, pedestal 10 is provided with a bearing flange 14 which forms the seat and rotation base for the power head 16. Base 10 is provided with a flanged outlet at 18 to accommodate the bearings necessary for the power input shaft 20. This shaft may receive its power from any suitable source although, on the smaller type of fishing boats to which this equipment is best adapted, power usually is supplied through output connections from the boat power plant. If the power equipped shaft 20 is horizontally disposed, as illustrated, then a gear box, as 21, will be required to change the direction of the power flow so as to energize the main drive shaft 22, of the winch. In certain installations, shaft 22 however, may extend straight downwardly to a point where it makes suitable connections to the prime mover of the boat.

In order to provide freedom of movement of the power head 16 upon pedestal 10, it is preferred to provide an annular bronze bearing member or ring, as 24, which normally seats on bearing flange 14. A clamping and positioning flange 26 is disposed below the top flange 14 of pedestal 10 and through bolts 25 pass through flange 26 of power head 16 and the clamping ring 26, so that the proper or desirable friction pressure can be placed on annular shims 27 so the desired drag can be placed upon the turning of the power head on the pedestal. Also, this will provide the sole means of securing the pedestal and the power head in their proper operating arrangement. Referring to Figure 6, it will be noted that a locking plunger 30 is slidably positioned in guides 29, secured to power head 16 and is caused to engage a positioning opening 32 in flange 14. These positioning openings 32, of which there may be several, are normally drilled after the winch has been installed on a boat, and it has been possible to align the power head to the various positions in which it will be used. At each such position, an opening 32 is provided, so as to, at all times, assure accurate and quick positioning of the power head. Suitable line belaying bitts 17 may be secured to member 16.

Plunger 30 normally is gravity seated assisted by pressure on the plunger cap 31. Plunger 30 is normally secured within guides 29 by a cotter pin 33 disposed between the guides. This arrangement assures easy removal of plunger 30 when necessary.

Disposed within power heads 16 are normally two or more driven shafts 34 and 35. Shaft 34, which may be used singly, is positioned directly above shaft 22 and at right angles thereto, it being desirable that the axis of these two shafts intersect so that a convenient, economical gear drive may be provided between the two shafts. In Figure 2 this has been shown in the simplest form as consisting of the bevelled gears 36 and 37.

A modification of this drive has been illustrated in Figure 4, in which three bevel gears as 36, 37, and 38 are employed, following the arrangement of reversing mechanisms. In this arrangement, normally, gears 37 and 38 are free to revolve with respect to shaft 34 and a slidable clutch member 40, which is keyed to shaft 34, can be engaged in either gear 37 or 38 in accordance with the direction of rotation desired. This is a desirable modification where it is not desirable to employ the gear change box illustrated at 42 in Figures 10 and 11. Shafts 34 and 35 and additional shafts if the same are used, are provided with suitable bearings secured within power head assembly 16. Shaft 34 normally extends outwardly on either side of housing 16, on one end a drum 44 may be secured that may take various forms to adapt the same to handle rope, chain or cable. Normally it is preferred, however, to employ a clutching and braking hub on each end of all shafts used so various spools or drums can be interchanged at will, to meet varying conditions of use.

On the opposite ends of shafts 34, 35 there is employed a spool or drum handling arrangement, illustrated in detail in Figures 5, 8 and 9. Disposed for normally free rotation on shaft 34, is the drum or spool hub 46. This is free to revolve on suitable bearings, as 47, and is held against movement off the end of the shaft by means of the locking disc 48 and the associated thrust washer 49. Disc is held in place by such means as the cap screw 51 and rotation of the same is prevented by means of dowel 53. Movement inwardly is prevented by a stop collar 50 which is secured to shaft 34. Hub 46 is provided with a conical drum at 52, adapted to receive, preferably, an internal driving clutch member 57. Fixedly secured as to housing 16 is a threaded bushing 54 through which shaft 34 can be journaled.

Slidably positioned on shaft 34 but driven by it, by means of key 55, is a thrust plate 57 forming the driving clutch members. This plate may have secured to it a friction surface material in the form of a cone shaped annular ring, or the engagement of the metal surfaces may be sufficient for light loading. Engagement of this friction surface with the flange 52 of hub 46 provides the drive for the hub, and, in turn, for the line spool 60. While various forms of compression arrangement to give this frictional engagement may be employed, there is illustrated in association with bushing 54 a lever 62 having a hub 63 with internal threaded bushing 65 clamped therein, co-acting with the external threads on bushing 54, these threads are normally of the square cut type, common to pressure devices of this order. In order to provide an operating arrangement between lever 62 and thrust plate 57 there is employed a thrust washer 64 and an annular ring or washer 66 which is secured to member 57, and engages a flange formed on member 65 so the lever can retract plate 57 and move it to the right as viewed, to disengage the friction. In order to give increased capacity for handling additional separate lines auxiliary spools as 61 may be applied to the standard type spools used with this winch.

The spool 60 seats loosely on the hub 46, which is stepped or has two bore diameters as an aid in quick seating. This gives it stability for turning and accurate positioning, and it is held in this position by a detent 68 formed as part of the spool and which passes through an opening 69 in the flange of hub 46. A spring locking arrangement, illustrated in Figure 9, is employed to hold the detent in the engaged position. To achieve this, a spring 70 is secured at one end, as by a bolt 71, and is under a fulcrum member 72 and is generally positioned by the keeper 73. It is given sufficient latitude however, so that when the finger engaging ring 74 is moved upwardly, as viewed in Figure 9, the spring will be withdrawn from the annular groove of detent 68 and the spool can be slipped off hub 46. In replacing the spool it is only necessary to pass the detent through opening 69 and the conical end of the detent is sufficient to deflect spring 70 until the detent is fully seated, then the spring will come to rest in the locking groove of the detent.

There are many times when, in handling a winch, that it is necessary to be able to stop the rotation of the drum and hold it in that position. To this end, a brake surface 56 has been provided as part of the hub 46 or attached thereto, and some convenient brake means is employed to engage it. One such means is shown in Figure 8 in which a metal brake band, cone or disc 76 is secured to bushing 65 and some suitable form of friction surface is employed to complete the brake unit. A convenient means of operating the brake is to employ an oppositely mounted cone 76 which, as will be noted in Figure 8, will move along shaft 34 with clutch member 57, thus a single control lever will, sequentially operate both the clutch and the brake. Reference is made to Figures 5 and 8 which show one convenient lever arrangement. This lever, for convenience in operation, has an upwardly extending handle portion 86 which is threaded to lever 62 and is caused to bear upon an arcuate slotted plate 87 which guides it and limits its travel. By turning handle 86 it can be caused to bear with pressure on plate 87 and thus lock into position. In constructing the threaded thrust engagement in the parts 54 and 65, the direction of rotation of the threads should be such, that as lever 62 and handle 86 are moved to the left, as viewed in Figure 1 or 9, the clutch will be engaged. At the central position, as shown, a neutral point will be reached and by moving the handle to the right, as viewed in Figure 1 or 9, braking effort will be placed upon the hub and thus hold the hub and any spool which may be disposed thereon. As considerable thrust is developed, suitable thrust bearings should be mounted on shaft 34 as at 82 and 83.

In the foregoing description, reference was made only to shaft 34, and while in the simplest form of the winch or as an attachment for existing winches, a single shaft may be used. It is to be considered that a winch of this order, to be most effective, should have at least two shafts and under certain conditions it may be desirable to have still additional driven shafts. On each shaft, and if desired, on each end of each shaft, the same clutching, braking and locking mechanism would be employed. In the showing of Figure 1 two shafts have been shown, the first driven shaft is in turn driven by power shaft 22 and has secured to it a sprocket preferably as 90. Shaft 35 has also a sprocket carrying the same size chain so that a satisfactory drive is provided by sprocket 91 and the connecting chain 92. Chain is not the only form of drive that might be employed, V belts of the fixed center type are now very common for a drive of this order. Such drives make it very convenient to increase the rotative speed of one of the shafts and is found very useful in certain types of fishing.

In Figures 10 and 11 is shown the deck of a fishing boat of the type for which this equipment is best adapted, and showing the winch in its two positions of use. In Figure 10 the plane of spools 60 are substantially at right angles to the length of the boat, but in any event they should match up with the guide roller 94 used. The winch is held in its position by the lock member 30, illustrated in detail in Figure 6. This is an ideal position for recovering the fishing line in that the operator can stand in the waist of the boat, where he has good deck space, and as the fish are pulled out of the water the large ones can be gaffed and assisted over the rail, whereas, the small ones can be handled by unsnapping the ganging from the line and easily disposed of. In Figure 11 the winch is shown in its position of laying the line, here the plane of the spools is substantially parallel to the longitudinal axis of the boat and the line passes through the vertical guide 95, consequently, the winch should be aligned so that the spools will be in line with this point of guidance.

In using two or more spools for the fishing line itself, it is very desirable that the same have their planes in a common plane and that there be sufficient elevation between the two so there will be no interference with each other. The proportions shown in Figure 1 have proved to be quite practical. In this instance, shafts 34 and 35 are spaced sufficiently far apart so there will be plenty of hand room between the peripheries of the two drums, and so the fisherman can handle the same with safety and convenience. Shaft 35 is disposed sufficiently above shaft 34 so there will be no interference as line is being payed out or taken in on the drum, driven by shaft 35.

It is believed it will be readily understood that this winch, while designed for the benefit of the long bottom fishing line type of fishing, lends itself to many other forms of fishing, and this is very desirable in that the fishing seasons for the different types of fish are being more generally curtailed by law, and it becomes necessary that a winch be sufficiently adaptable that it can be employed in various types of fishing as the seasons and conditions permit.

It is believed that it will be clearly apparent from the above description and the disclosure in the drawings that the invention comprehends a novel construction of a removable drum fishing winch.

Having thus disclosed the invention, I claim:

1. A fishing winch, comprising: a power head; means for supporting said power head, permitting revolution of said power head about a vertical axis; a vertical drive shaft journaled in said supporting means; a plurality of horizontal driven shafts journaled in said power head, said driven shafts being spaced from and parallel to each other and at different levels; drive means connecting said driven shafts; a spool receiving hub positioned on each of said driven shafts; drive means connecting one of said driven shafts to said drive shaft; a drum secured to each of said hubs disposed coaxially with the associated driven shaft, said drum having its internal annular surface formed with two adjacent conical surfaces; a bushing positioned on each driven shaft and secured to said power head, said driven shafts being rotatable in respect to said bushing, and said bushing having external threads; a brake member positioned on each bushing having internal threads, said brake member having an outer conical surface positioned in the associated drum substantially parallel to the conical surface of said drum away from said hub; a clutch member positioned on each driven shaft having an outer conical surface positioned in the associated drum substantially parallel to the conical surface of said drum toward said hub; key means between each clutch member and driven shaft permitting longitudinal movement of said clutch member along said driven shaft but not permitting relative rotation therebetween; means for securing clutch members and brake members together for longitudinal movement along the associated driven shaft but permitting rotation between said members; a lever secured to each brake member and extending outward; and means for adjustably securing each lever to said power head.

2. A fishing winch, comprising: a power head; means for supporting said power head, permitting revolution of said power head about a vertical axis; a vertical drive shaft journaled in said supporting means; a horizontal driven shaft journaled in said power head; drive means connecting said drive shaft and said driven shaft; a spool receiving hub positioned on said driven shaft; a drum secured to said hub disposed coaxially with said driven shaft, said drum having its internal annular surface formed with two adjacent conical surfaces, said conical surfaces narrowing as they separate; a bushing positioned on said driven shaft and secured to said power head, said driven shaft being rotatable in respect to said bushing, said bushing having external threads; a brake member positioned on said bushing having internal threads, said brake member having an outer conical surface positioned in said drum substantially parallel to the conical surface of said drum away from said hub; a clutch member positioned on said driven shaft having an outer conical surface positioned in said drum substantially parallel to the conical surface of said drum toward said hub; key means between said clutch member and said driven shaft permitting longitudinal movement of said clutch member along said driven shaft but not permitting relative rotation therebetween; means for securing said clutch member and said brake member together for longitudinal movement along said driven shaft but permitting rotation between said members; a lever secured to said brake member and extending outward; and means for adjustably securing said lever to said power head.

3. A fishing winch, comprising: a power head; means for supporting said power head permitting revolution of said power head about a vertical axis; a vertical drive shaft journaled in said supporting means; a first horizontal driven shaft journaled in said power head; drive means connecting said drive shaft and said first driven shaft; a second driven shaft journaled in said power head and spaced from and parallel to said first driven shaft and at a different level; drive means connecting said driven shafts; a spool receiving hub positioned to revolve on an end of each driven shaft, each hub having clutching and braking surfaces spaced apart longitudinally of each driven shaft; a braking member and a clutching member positioned on each driven shaft and said braking and clutching members and surfaces being circumferentially enclosed, said braking member being connected to said power head in a manner permitting little relative rotary movement therebetween and said clutching member being keyed to its driven shaft preventing rotary movement therebetween; means coaxial with said driven shafts operable selectively to move the braking and clutching members longitudinally of the driven shafts into contact with said clutching and braking surfaces; and a spool removably positioned on each hub.

4. A fishing winch, comprising: a pedestal base adapted to be secured to a supporting surface; a power head mounted upon said base and disposed for revolution about a vertical axis on said base; said power head and pedestal base having coacting stop means for selective directional positioning of said power head on said base; a vertical drive shaft journaled in said base; a plurality of horizontal driven shafts journaled in said power head, said driven shafts being spaced from and parallel to each other; drive means connecting said driven shafts to said drive shaft; a hub positioned on an end of each driven shaft, each hub having its exterior bearing surface formed with an inner cylindrical bearing surface and an outer cylindrical bearing surface of smaller diameter than said inner bearing surface; manually adjustable clutching and braking means between said hubs and said driven shafts; and a spool removably positioned on each of said hubs, each spool having its interior bearing surface formed with two cylindrical bearing surfaces of different diameters to match the bearing surfaces of said hubs.

5. A fishing winch, comprising: a pedestal base adapted to be secured to a supporting surface; a power head mounted upon said base and disposed for revolution about a vertical axis on said base; said power head and pedestal base having coacting stop means for selective directional positioning of said power head on said base; a vertical drive shaft journaled in said base; a plurality of horizontal driven shafts journaled in said power head, said driven shafts being spaced from and parallel to each other; drive means connecting said driven shafts to said drive shaft; a hub positioned on an end of each driven shaft, each hub having its exterior bearing surface formed with an inner cylindrical bearing surface and an outer cylindrical bearing surface of smaller diameter than said inner bearing surface; manually adjustable clutching and braking means between said hubs and said driven shafts; a spool removably positioned on each of said hubs, each spool having its interior bearing surface formed with two cylindrical bearing surfaces of different diameters to match the bearing surfaces of said hubs; each of said spools having outstanding on its inner end a detent having a groove in its side; each hub having an opening in which said detent is positioned; and a spring lock on each of said hubs adjacent said opening and engaged in said groove.

6. In a fishing winch mechanism having a shaft journaled in a housing and connected to a source of power and a member to be rotated positioned on said shaft, a clutching and braking mechanism, comprising: a drum secured to said member to be rotated and disposed coaxially with the same, said drum having an internal annular surface formed with two adjacent frusto-conical surfaces facing one another; a clutch keyed on said shaft in a manner permitting movement of said clutch longitudinally of the shaft and preventing relative rotation between the shaft and the clutch, said clutch having an outer frusto-conical surface positioned in said drum substantially parallel to the conical surface of said drum toward said member to be rotated; a bushing positioned on said shaft, said shaft being rotatable with respect to said bushing, said bushing having external threads; a brake positioned on said bushing having internal threads engaging the external threads of the bushing, said brake having an outer frusto-conical surface positioned in said drum substantially parallel to the conical surface of said drum away from said member to be rotated; said brake and clutch being rotatable in relation to each other and being connected together to move together longitudinally of said shaft; and manually adjustable means for adjusting the position of said brake on said bushing to selectively move said clutch and said brake into contact with the frusto-conical surfaces of said drum.

FRED W. ROWE.

References Cited in the file of this patent

UNITED STATES PATENTS

| Number | Name | Date |
|---|---|---|
| 261,530 | Coffin | July 25, 1882 |
| 706,113 | Roebuck | Aug. 5, 1902 |
| 1,285,663 | Fouse | Nov. 26, 1918 |
| 2,095,409 | Deluchi et al. | Oct. 12, 1937 |
| 2,199,659 | Courville | May 7, 1940 |

FOREIGN PATENTS

| Number | Country | Date |
|---|---|---|
| 781,821 | France | May 22, 1935 |